(12) United States Patent
Postrel

(10) Patent No.: US 11,808,401 B2
(45) Date of Patent: Nov. 7, 2023

(54) ADJUSTABLE DISPLAY DEVICE ASSEMBLY

(71) Applicant: Richard Postrel, Miami Beach, FL (US)

(72) Inventor: Richard Postrel, Miami Beach, FL (US)

( * ) Notice: Subject to any disclaimer, the term of this patent is extended or adjusted under 35 U.S.C. 154(b) by 0 days.

(21) Appl. No.: 17/749,895

(22) Filed: May 20, 2022

(65) Prior Publication Data

US 2023/0323997 A1    Oct. 12, 2023

Related U.S. Application Data

(60) Provisional application No. 63/328,438, filed on Apr. 7, 2022.

(51) Int. Cl.
| | |
|---|---|
| *F16M 13/02* | (2006.01) |
| *F16M 11/16* | (2006.01) |
| *F16M 11/04* | (2006.01) |
| *F16M 11/10* | (2006.01) |

(52) U.S. Cl.
CPC .......... *F16M 11/16* (2013.01); *F16M 11/046* (2013.01); *F16M 11/10* (2013.01); *F16M 13/02* (2013.01); *F16M 2200/024* (2013.01)

(58) Field of Classification Search
CPC ...... F16M 11/16; F16M 11/046; F16M 11/10; F16M 13/02; F16M 2200/024; A47D 13/04; H04M 1/04

USPC .......................... 248/163.1, 176.1, 917, 449
See application file for complete search history.

(56) References Cited

U.S. PATENT DOCUMENTS

| | | | |
|---|---|---|---|
| 8,205,561 B1 * | 6/2012 | Bierworth ............ | A61G 5/1094 108/157.11 |
| 2004/0007651 A1 * | 1/2004 | Williams ............... | F16M 13/00 248/346.06 |
| 2004/0031900 A1 * | 2/2004 | Chang .................... | A47B 97/08 248/461 |
| 2014/0091193 A1 * | 4/2014 | Simon .................. | F16M 11/105 248/458 |
| 2015/0108317 A1 * | 4/2015 | Cruz ........................ | B62B 9/26 248/479 |
| 2020/0336581 A1 * | 10/2020 | Allen ..................... | F16M 11/16 |

* cited by examiner

*Primary Examiner* — Terrell L McKinnon
*Assistant Examiner* — Jerry Olivier
(74) *Attorney, Agent, or Firm* — Sutton Magidoff Barkume LLP

(57) ABSTRACT

A portable display device assembly suitable for use with a separate apparatus such as a toddler walker, cart, wagon or similar apparatus and which is adjustable to suit the needs of the user. The portable display device assembly has means for holding a display device, which includes a display device support panel and a display device support rail slidingly engaged with the display device support panel such that the height of the display device support rail may be raised or lowered with respect to the display device support panel. There is also a means for pivoting the display device support panel and means for attaching the means for holding a display device to a separate apparatus.

2 Claims, 3 Drawing Sheets

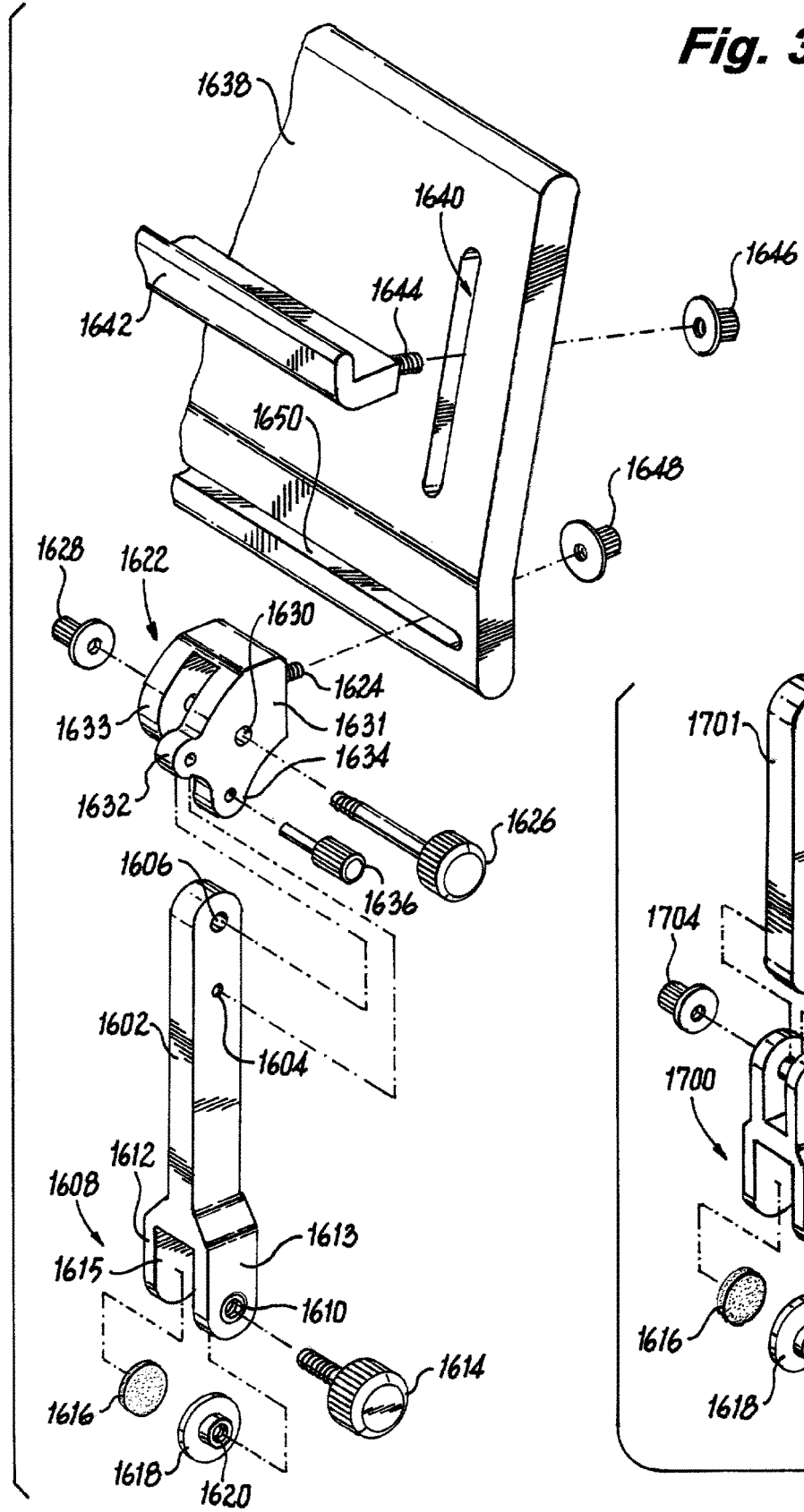
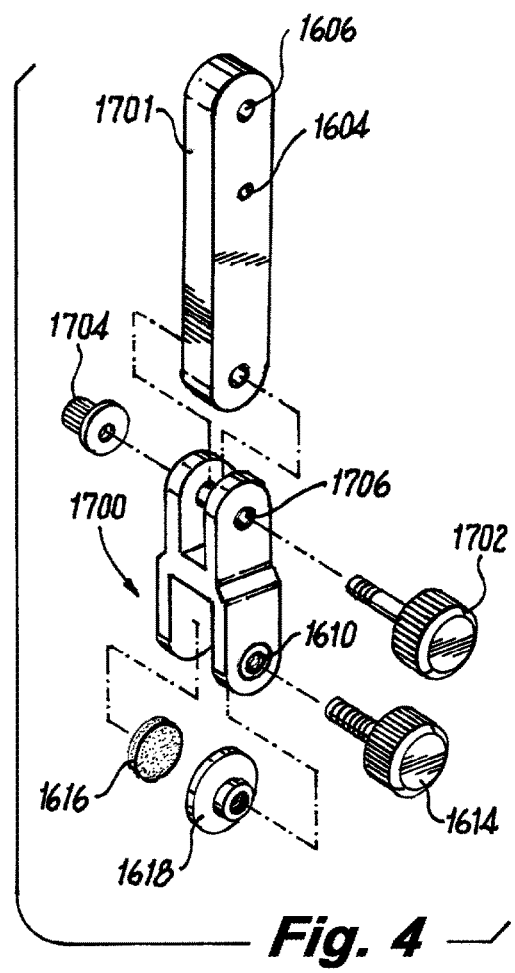
Fig. 3
Fig. 4

ADJUSTABLE DISPLAY DEVICE ASSEMBLY

TECHNICAL FIELD

This application relates to an apparatus for holding a display device, and in particular to such an apparatus that is suitable for removably mounting onto a separate apparatus such as a toddler walker, cart, wagon or similar apparatus and which is adjustable to suit the needs of the user.

BACKGROUND OF THE INVENTION

Interactive display devices such as IPADs and the like are ubiquitous and very useful for entertaining small children such as toddlers. In particular, it is desired to be able to use a display device in conjunction with a toddler walker (a wheeled cart that assists toddlers in learning to walk) in order to engage the toddler in the process of walking. Toddler walkers may exist in different forms, but in general include a body and four wheels, and a handle suitable for the toddler to hold onto while he or she begins to walk. The walker provides a stable vehicle that the toddler can lean on as they take their first steps, eventually enabling the toddler to gain the balance, strength, and confidence to walk on their own without relying on the walker. These existing walkers, however, lack the ability to provide engagement of the toddler with the walker through an interactive display device or the like. Likewise, other wheeled products such as shopping carts do not easily allow a user to mount a display device or the like for use while the product is being wheeled about.

SUMMARY OF THE INVENTION

Provided herein is a portable display device assembly suitable for use with a separate apparatus such as a toddler walker, cart, wagon or similar apparatus and which is adjustable to suit the needs of the user. The portable display device assembly has means for holding a display device, which includes a display device support panel and a display device support rail slidingly engaged with the display device support panel such that the height of the display device support rail may be raised or lowered with respect to the display device support panel. There is also a means for pivoting the display device support panel and means for attaching the means for holding a display device to a separate apparatus.

The display device support panel may have a pair of vertically aligned slots, and the display device support rail will then have a pair of threaded studs. In this case, the display device support rail is slidingly engaged with the display device support panel by inserting each threaded stud of the display device support rail into a mating slot on the display device support panel and securing the support rail at the desired vertical position against the support panel with a nut threaded onto each of the threaded studs of the support rail.

The means for attaching the means for holding a display device to a separate apparatus may include a pair of legs, each leg having means for pivotally attaching the leg at a first end to the means for holding a display device and means for removably attaching the leg at a second end to a separate apparatus.

The means for pivotally attaching the leg at a first end to the means for holding a display device includes a leg fixture that has a first wall with a horizontal lock lobe, a vertical lock lobe, and a rotation aperture. The leg fixture also has a second wall coupled to the first wall and a stud protruding away from the leg fixture. The display device support panel has a slot, and the stud of the leg fixture is located through the slot of the support panel and urged against the support panel with a nut threaded onto the stud. Further, the leg has a rotation aperture and the leg fixture is rotatably mated with the leg with a leg bolt inserted through the rotation aperture of the leg fixture and the rotation aperture of the leg and secured with a nut threaded onto the leg bolt. A leg locking pin is selectively inserted through the vertical lock lobe of the leg fixture and a locking aperture on the leg in order to orient the means for holding a display device substantially vertically, or through the horizontal lock lobe of the leg fixture and the locking aperture on the leg in order to orient the means for holding a display device substantially horizontally, as desired.

The means for removably attaching the leg at a second end to a separate apparatus includes a compression clevis having a first leg fork and a second leg fork separated by a holding space, the second leg fork including a tapped insert. There is also a bolt, a threaded pad, and a neoprene pad. When the compression clevis is placed on a desired location of a separate apparatus such that the holding space surrounds a surface of the separate apparatus, and the bolt is inserted through the tapped insert of the second leg fork and into the threads of the threaded pad, the threaded pad is urged against the surface of the separate apparatus which is in turn urged against the neoprene pad, thus compressing the compression clevis around the surface of the separate apparatus in the desired location.

In an alternative embodiment, the means for removably attaching the leg at a second end to a separate apparatus includes a modified compression clevis separated from the leg, and including a first leg fork and a second leg fork separated by a holding space, the second leg fork including a tapped insert. The first leg fork and the second leg fork each have a pivoting aperture, and there is also a pivoting bolt and a pivoting nut, a bolt, a threaded pad; and a neoprene pad. When the compression clevis is placed on a desired location of a separate apparatus such that the holding space surrounds a surface of the separate apparatus, and the bolt is inserted through the tapped insert of the second leg fork and into the threads of the threaded pad, the threaded pad is urged against the surface of the separate apparatus which is in turn urged against the neoprene pad, thus compressing the compression clevis around the surface of the separate apparatus in the desired location. As modified, the pivoting bolt is inserted through the pivoting aperture of the first leg fork, an aperture in the leg, and the pivoting aperture of the second leg fork, and secured in place with the pivoting nut.

In a further alternative embodiment, the means for attaching the means for holding a display device to a separate apparatus includes a leg fixture that has a first wall having a horizontal lock lobe, a vertical lock lobe, and a rotation aperture. A second wall is coupled to the first wall, and a stud protrudes away from the leg fixture. The display device support panel has a slot, and the stud of the leg fixture is located through the slot of the support panel and urged against the support panel with a nut threaded onto the stud. A locking mechanism is inserted through the rotation aperture of the leg fixture and urged against a desired surface of the separate apparatus. A leg locking pin is selectively inserted through the vertical lock lobe of the leg fixture and secured against the separate apparatus in order to orient the means for holding a display device substantially vertically, or through the horizontal lock lobe of the leg fixture and secured against the separate apparatus in order to orient the means for holding a display device substantially horizontally, as desired.

BRIEF DESCRIPTION OF THE DRAWING

FIG. 3 is an exploded view of the portable device assembly of FIGS. 1 and 2.

FIG. 4 is an exploded view of a modified portable device assembly of FIGS. 1 and 2.

DETAILED DESCRIPTION OF THE INVENTION

Figure 1:
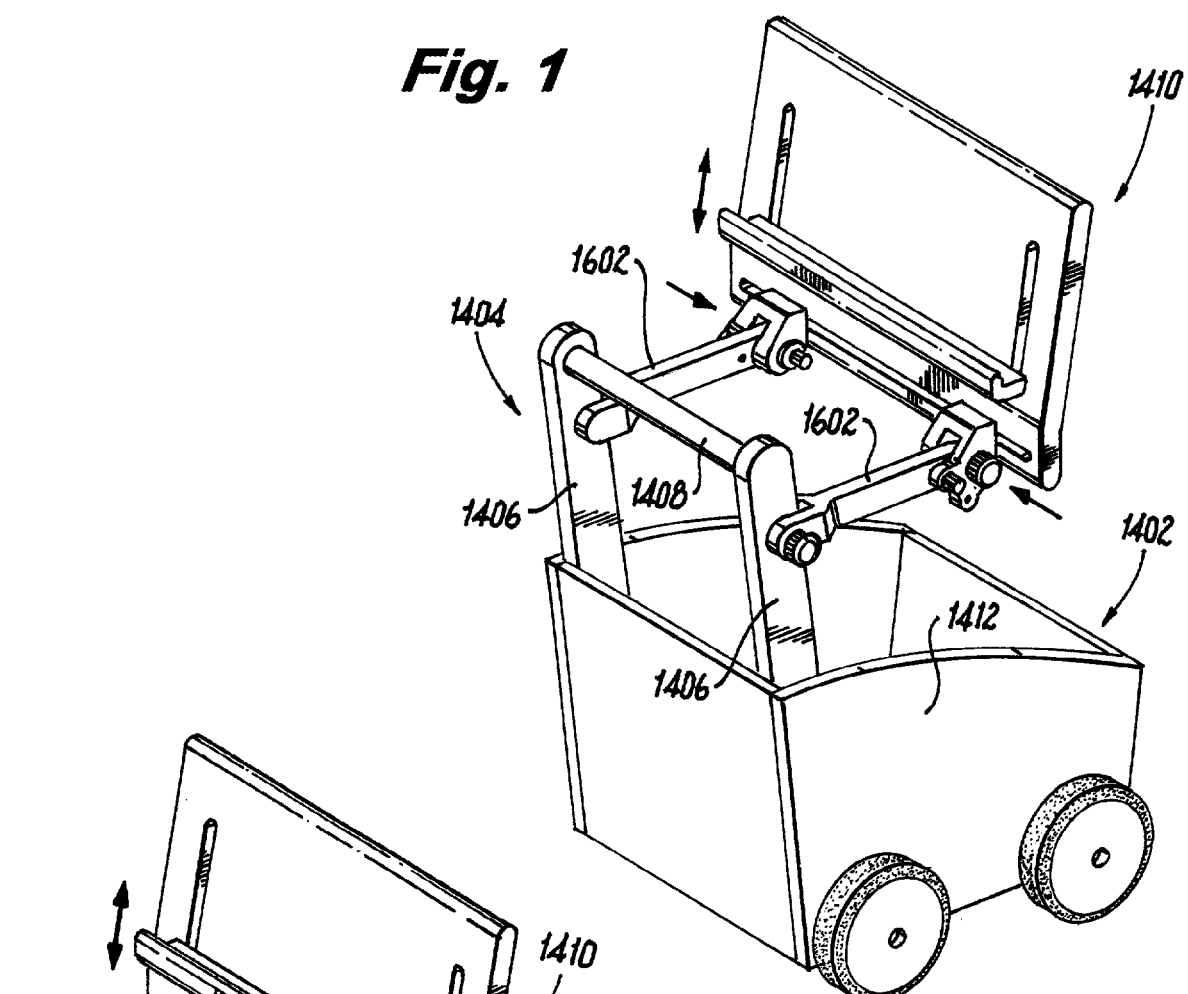
FIG. 1 is a perspective view of a first embodiment of a portable display device assembly attached to a handlebar assembly of a standard toddler walker in the prior art.
Figure 2:
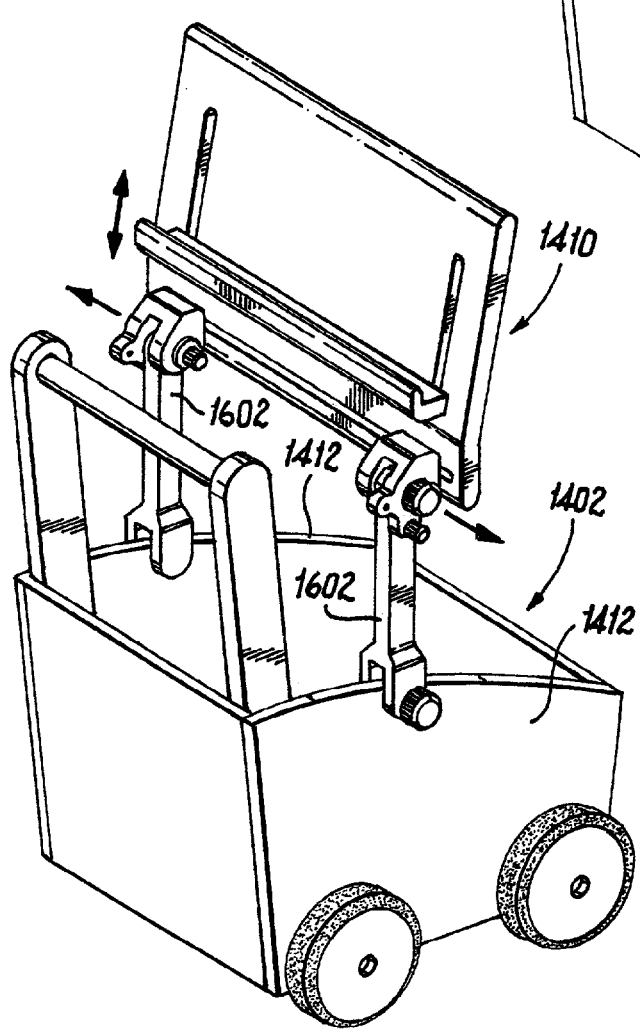
FIG. 2 is a perspective view of the portable display device assembly of FIG. 1 attached to the side panels of a standard toddler walker in the prior art.

In accordance with a preferred embodiment of the invention, a portable display device assembly is provided as a stand-alone, portable apparatus suitable for use with a separate apparatus such as a toddler walker, shopping cart, wagon or the like. Thus, shown in FIG. 1 is a perspective view of a first embodiment of a portable display device assembly 1410 attached to a handlebar assembly 1404 of a separate apparatus such as but not limited to a standard toddler walker 1402 as may exist the prior art. FIG. 2 is a perspective view of the portable display device assembly 1410 of FIG. 1 attached to the side panels 1412 of the toddler walker 1402. That is, the legs 1602 may be removably attached to the side panels 1412 as in FIG. 2 or the handlebar assembly 1404 as in FIG. 1, as may be desired by the user.

With further reference to FIG. 3, which is an exploded view of the portable device assembly of FIGS. 1 and 2, the portable display device assembly has means for holding a display device, which includes a display device support panel 1638 and a display device support rail 1642 slidingly engaged with the display device support panel 1638 such that the height of the display device support rail 1642 may be raised or lowered with respect to the display device support panel 1638. The display device support panel 1638 has a pair of vertically aligned slots 1640, and the display device support rail 1642 has a pair of threaded studs 1644. The display device support rail 1642 is slidingly engaged with the display device support panel 1638 by inserting each threaded stud 1644 of the display device support rail 1642 into a mating slot 1640 on the display device support panel 1638 and securing the support rail 1642 at the desired vertical position against the support panel 1638 with a nut 1646 threaded onto each of the threaded studs 1644 of the support rail 1642. As can be seen, FIG. 3 illustrates only one side of this assembly; the same assembly is provided on the opposite side in mirror image form.

Means are provided for attaching the means for holding a display device to a separate device such as the toddler walker, which in this embodiment will have a pair of legs 1602, each leg having means for pivotally attaching the leg 1602 at a first end to the means for holding a display device and means for removably attaching the leg 1602 at a second end to a toddler walker.

The means for pivotally attaching the leg 1602 at a first end to the means for holding a display device includes a leg fixture 1622 that has a first wall 1631 with a horizontal lock lobe 1632, a vertical lock lobe 1634, and a rotation aperture 1630. The leg fixture also has a second wall 1633 coupled to the first wall 1631 by a cross member, with a stud 1624 mounted on the cross member and protruding away from the leg fixture 1622. The display device support panel has a slot 1650, and the stud 1624 of the leg fixture 1622 is located through the slot 1650 and urged against the support panel 1638 with a nut 1648 threaded onto the stud 1624, securing the leg fixture 1622 to the support panel 1638. The leg fixture 1622 is rotatably mated with the leg 1602 with a leg bolt 1626 inserted through the rotation aperture 1630 of the leg fixture 1622 and the rotation aperture 1606 of the leg 1602, and then it is secured with a nut 1628 threaded onto the leg bolt 1626.

A leg locking pin 1636 is selectively inserted through the vertical lock lobe 1634 of the leg fixture 1622 and a locking aperture 1604 on the leg 1602 in order to orient the means for holding a display device substantially vertically, or through the horizontal lock lobe 1632 of the leg fixture 1622 and the locking aperture 1604 on the leg 1602 in order to orient the means for holding a display device substantially horizontally, as may be desired by the user.

The means for removably attaching the leg at a second end to a separate device such as a toddler walker includes a compression clevis 1608 having a first leg fork 1612 and a second leg fork 1613 separated by a holding space 1615. The second leg fork 1613 has a tapped insert 1610 located as shown. When the compression clevis 1608 is placed on a desired location of a toddler walker such that the holding space 1615 surrounds a surface of the toddler walker, and a bolt 1614 is inserted through the tapped insert 1610 of the second leg fork 1613 and into the threads 1620 of a threaded pad 1618, the threaded pad 1618 is urged against the surface of the toddler walker which is in turn urged against a neoprene (or other similar material) pad 1616, thus compressing the compression clevis 1608 around the surface of the toddler walker in the desired location.

FIG. 4 is an exploded view of a modified portable device assembly of FIGS. 1 and 2. In this alternative embodiment, the means for removably attaching the leg at a second end to a separate device such as a toddler walker includes a modified compression clevis 1700 which is separate and apart from the leg 1701, and includes a first leg fork and a second leg fork separated by a holding space, the second leg fork including a tapped insert 1610, all similar to the embodiment of FIG. 3 described above. The first leg fork and the second leg fork each have a pivoting aperture 1706, and there is also a pivoting bolt 1702 and a pivoting nut 1704, a bolt 1614, a threaded pad 1618 and a neoprene pad 1616. As in FIG. 3, when the compression clevis 1700 is placed on a desired location of a toddler walker such that the holding space surrounds a surface of the toddler walker, and the bolt 1614 is inserted through the tapped insert 1610 of the second leg fork and into the threads of the threaded pad 1618, the threaded pad 1618 is urged against the surface of the toddler walker which is in turn urged against the neoprene pad 1616, thus compressing the compression clevis 1700 around the surface of the toddler walker in the desired location. As modified by FIG. 4, the pivoting bolt 1702 is inserted through the pivoting aperture 1706 of the first leg fork, an aperture in the leg 1701, and the pivoting aperture of the second leg fork, and secured in place with the pivoting nut 1704. This embodiment allows the leg 1701 to independently rotate and pivot with respect to the compression clevis, whereas in the embodiment shown in FIG. 3 such rotation is not provided.

Figure 5:
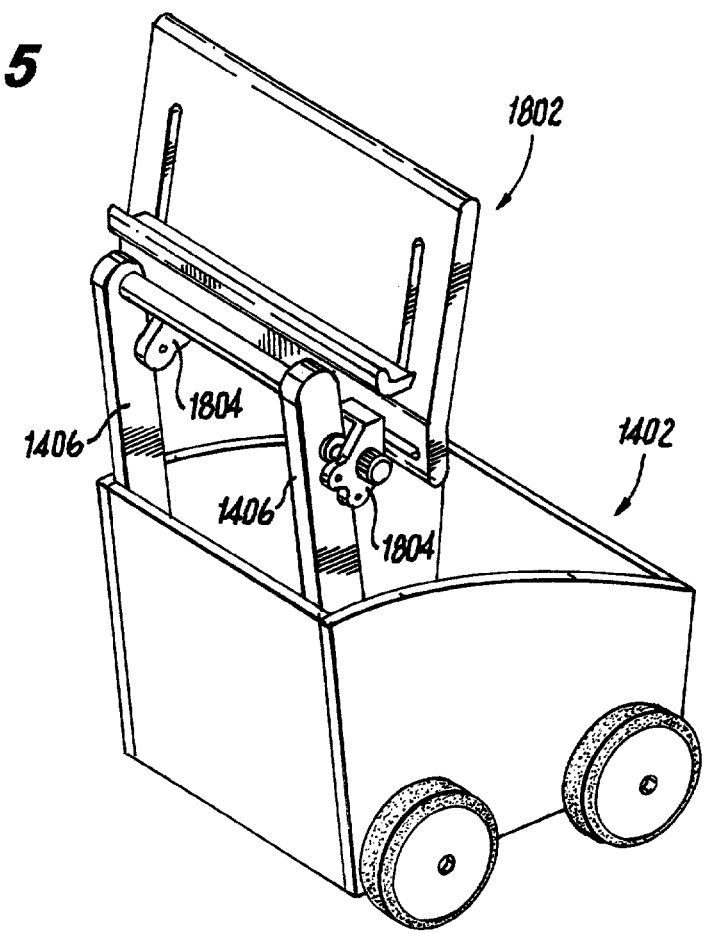
FIG. 5 is a perspective view of a second embodiment of a portable display device assembly attached to a handlebar assembly of a standard toddler walker in the prior art.
Figure 6:
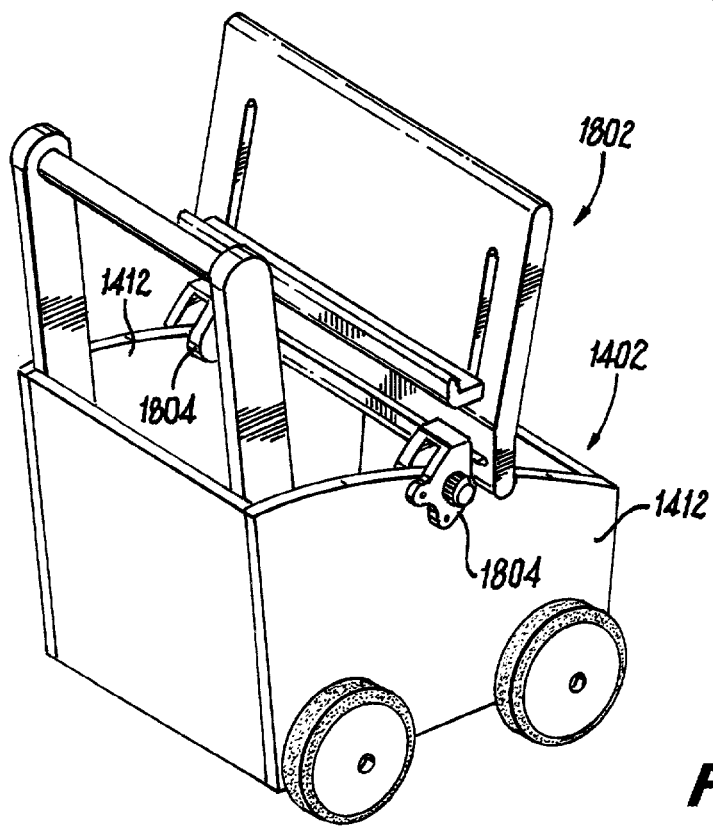
FIG. 6 is a perspective view of the portable display device assembly of FIG. 5 attached to the side panels of a standard toddler walker in the prior art.

FIG. 5 is a perspective view of a second embodiment of a portable display device assembly attached to a handlebar assembly of a separate device such as a standard toddler walker, and FIG. 6 is a perspective view of the portable display device assembly of FIG. 5 attached to the side panels of a standard toddler walker in the prior art. In this modified portable display device assembly 1802, the means for attaching the means for holding a display device to a separate device such as a toddler walker includes a leg fixture that has a first wall having a horizontal lock lobe, a vertical lock lobe, and a rotation aperture. A second wall is coupled to the first wall, and a stud protrudes away from the leg fixture. The display device support panel has a slot, and the stud of the leg fixture is located through the slot of the support panel and urged against the support panel with a nut threaded onto the stud. A locking mechanism 1804 is inserted through the rotation aperture of the leg fixture and urged against a desired surface of the toddler walker. A leg locking pin is selectively inserted through the vertical lock lobe of the leg fixture and secured against the toddler walker in order to orient the means for holding a display device substantially vertically, or through the horizontal lock lobe of the leg fixture and secured against the toddler walker in order to orient the means for holding a display device substantially horizontally, as desired.

With respect to all embodiments as described above, the entertainment and attention getting factor provided by the child's favorite video program presentation on the display device including familiar music, characters and learning animation is the key factor in increasing attention and commitment to by the child to working with the device.

What is claimed is:

1. A portable display device assembly comprising:
   (a) means for holding a display device, comprising:
      (i) a display device support panel comprising a pair of vertically aligned slots,
      (ii) a display device support rail, comprising a pair of threaded studs, slidingly engaged with the display device support panel by inserting each threaded stud of the display device support rail into a mating slot on the display device support panel and securing the display device support rail at the desired vertical position against the display device support panel with a nut threaded onto each of the threaded studs of the display device support rail, such that the height of the display device support rail may be raised or lowered with respect to the display device support panel, and
      (iii) means for pivoting the display device support panel; and
   (b) means for attaching the means for holding a display device to a separate apparatus, said means comprising a pair of legs, each leg comprising
      (i) means for pivotally attaching the leg at a first end to the means for holding a display device, said means comprising a leg fixture comprising
         (A) a first wall comprising a horizontal lock lobe, a vertical lock lobe, and a rotation aperture,
         (B) a second wall coupled to the first wall, and
         (C) a stud protruding away from the leg fixture; wherein the display device support panel comprises a slot and the stud of the leg fixture is located through the slot of the support panel and urged against the support panel with a nut threaded onto the stud, further wherein the leg comprises a rotation aperture and the leg fixture is rotatably mated with the leg with a leg bolt inserted through the rotation aperture of the leg fixture and the rotation aperture of the leg and secured with a nut threaded onto the leg bolt, further wherein a leg locking pin is selectively inserted through the vertical lock lobe of the leg fixture and a locking aperture on the leg in order to orient the means for holding a display device substantially vertically, or through the horizontal lock lobe of the leg fixture and the locking aperture on the leg in order to orient the means for holding a display device substantially horizontally, as desired, and
      iii) means for removably attaching the leg at a second end to a separate apparatus.

2. The portable display device assembly of claim 1 wherein the means for removably attaching the leg at a second end to a separate apparatus comprises
   a compression clevis comprising a first leg fork and a second leg fork separated by a holding space, the second leg fork comprising a tapped insert;
   a bolt;
   a threaded pad comprising threads; and
   a neoprene pad;
   wherein, when the compression clevis is placed on a desired location of a separate apparatus such that the holding space surrounds a surface of the separate apparatus, and the bolt is inserted through the tapped insert of the second leg fork and into the threads of the threaded pad, the threaded pad is urged against the surface of the separate apparatus which is in turn urged against the neoprene pad, thus compressing the compression clevis around the surface of the separate apparatus in the desired location.

* * * * *